No. 892,509. PATENTED JULY 7, 1908.
E. D. FALKNER.
MAIL CART.
APPLICATION FILED MAR. 4, 1907.
2 SHEETS—SHEET 2.
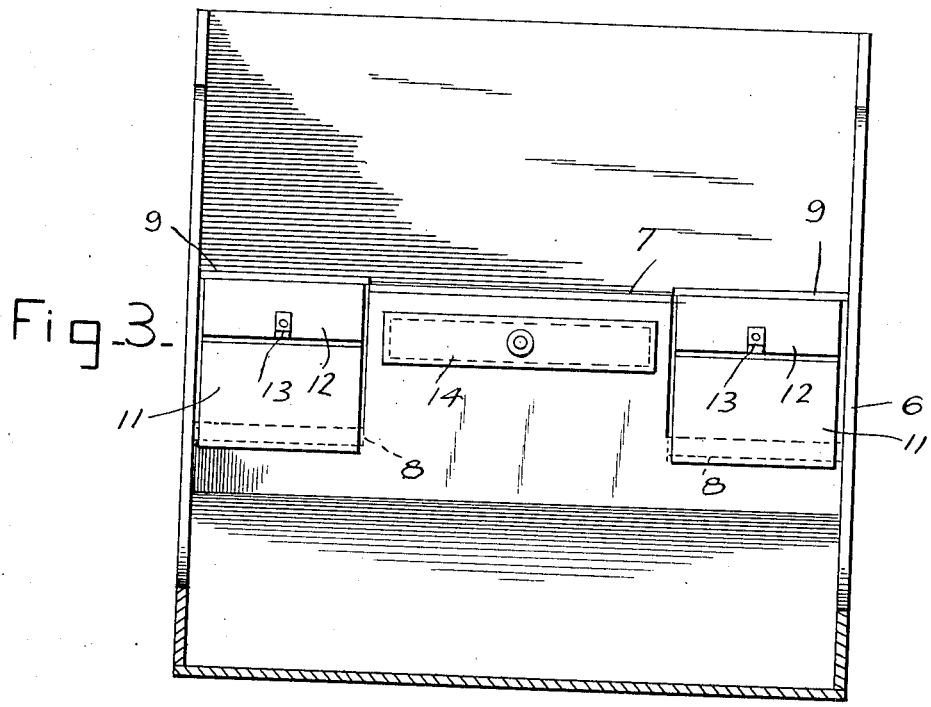
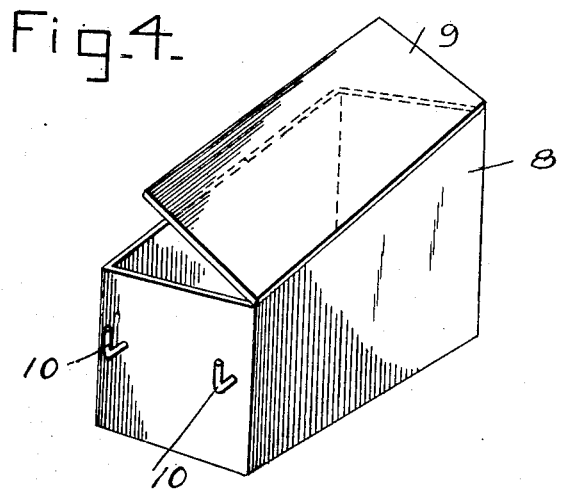
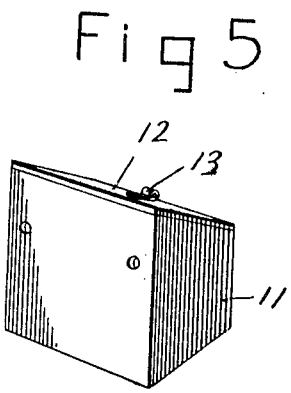

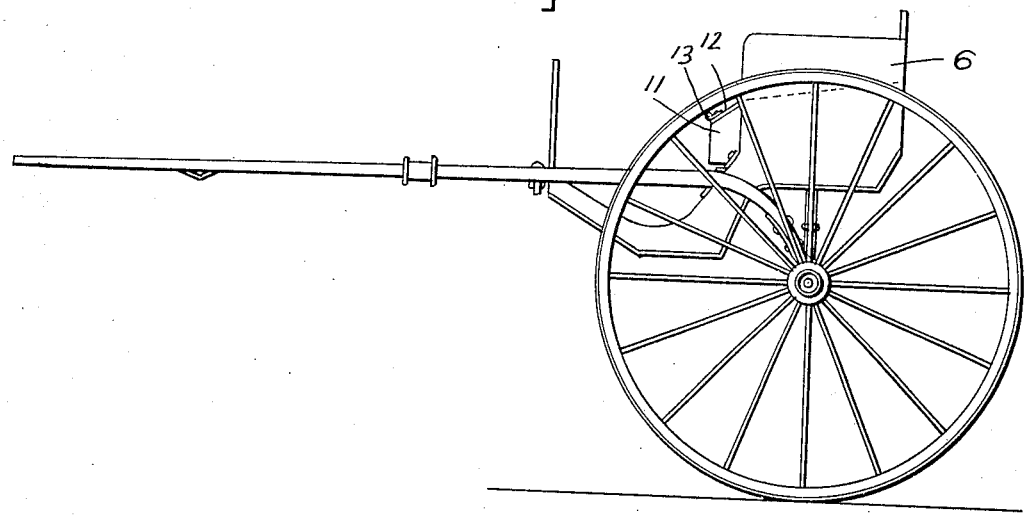
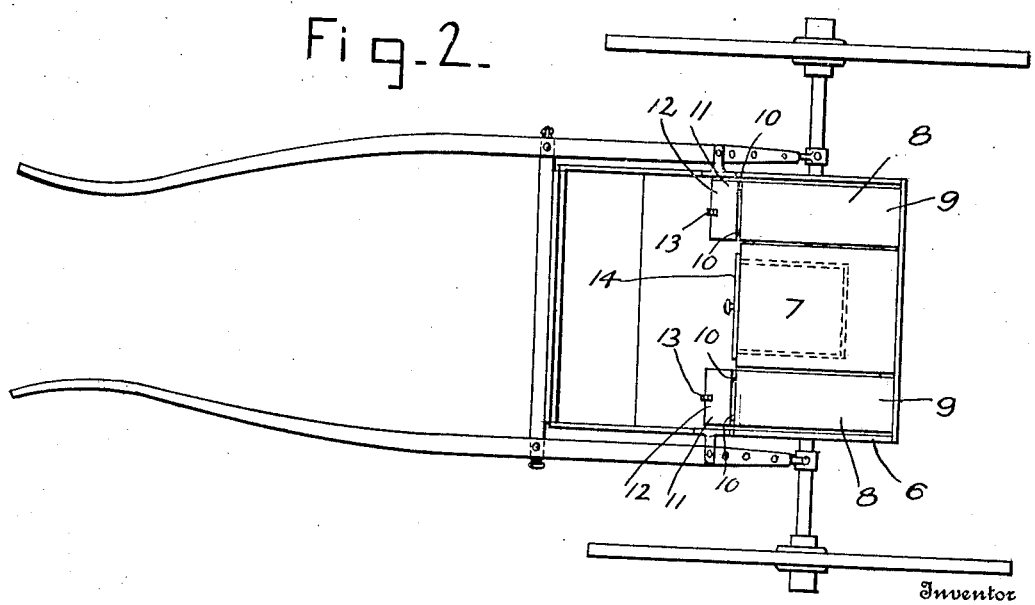

UNITED STATES PATENT OFFICE.

ELMER D. FALKNER, OF CUMBERLAND, WISCONSIN.

MAIL-CART.

No. 892,509.  Specification of Letters Patent.  Patented July 7, 1908.

Application filed March 4, 1907. Serial No. 360,417.

*To all whom it may concern:*

Be it known that I, ELMER D. FALKNER, a citizen of the United States, residing at Cumberland, in the county of Barron, State of Wisconsin, have invented certain new and useful Improvements in Mail-Carts; and I do hereby declare the following to be a full, clear, and exact description of the invention such as will enable others skilled in the art to which it appertains to make and use the same.

The present invention has reference to mail carts and more particularly to vehicles of that type adapted especially for suburban and rural delivery routes, and it aims to provide a light and easy running mail cart, in which the body portion carries a pair of mail boxes disposed on opposite sides of the seat within easy reach of the occupant thereof.

A further object of the invention includes the provision of a change attachment for one of the mail boxes secured to the front face thereof to enable the carrier to deposit the coins received by him during his trip without alighting from the cart.

With the above and other ends in view, the invention consists in the construction, combination, and arrangement of parts, all as hereinafter fully described, specifically claimed, and illustrated in the accompanying drawings, in which like parts are designated by corresponding reference numerals in the several views.

Of the said drawings—Figure 1 is a side elevation of a mail cart constructed in accordance with the present invention. Fig. 2 is a top plan view thereof. Fig. 3 is a front elevation of the cart body. Fig. 4 is a perspective view of one of the mail boxes showing the change attachment carried thereby. Fig. 5 is a perspective view of the change attachment, showing the holes formed in the rear face thereof, in which the fastening hooks on the mail box are engaged.

Referring more particularly to the drawings, reference numeral 6 designates generally the body of the cart which is mounted on the springs carried by the axle of the cart.

The cart body, as shown in Fig. 3, includes a seat 7, disposed centrally thereof, and a pair of mail boxes 8 arranged on opposite sides of the seat and occupying the space between the sides of the seat and the walls of the cart body. The top of each mail box lies slightly below the upper face of the seat, so that when the hinged covers 9 of the boxes are raised they will be partially engaged on one side by the sides of the seat, and thus to some extent retained in such position. The rear end of each mail box is somewhat higher than the front end thereof, so that the top of the box slopes downwardly and may be used as a desk upon which letters and packages may be placed prior to being addressed. It is to be understood, however, that the desks so formed are provided primarily for persons stopping the carrier along his route.

The front face of each mail box is provided with a pair of hooks 10, which are passed through a pair of openings formed in the rear face of a box 11, which serves as a receptacle for stamps and coins. This box is likewise provided with an inclined cover 12, which is hinged at its rear edge to the box and is provided at its front edge with a thumb-piece 13, by means of which the cover is raised.

In addition to the change or coin attachment, above described, the cart body may be further provided with a drawer 14 disposed beneath the seat 7 and likewise serving as a receptacle for change and stamps.

Owing to the disposition of the change attachment 11 upon one of the mail boxes, it will be apparent that the carrier may easily reach thereinto in making change when required and may likewise deposit therein all coins received in payment for stamps etc. It will be evident, moreover, that during such action the attachment itself may be completely disengaged from the mail box, if desired by the carrier. In no event, however, is it necessary for the carrier to alight from the cart either in disposing of stamps etc. or in depositing the money received in payment therefor. It will likewise be apparent that the change attachment may be secured to either box to suit the convenience of the carrier as the attachment may be readily and quickly removed from its supporting hooks.

The mail boxes in practice are preferably partitioned in the usual manner and one box usually serves as a receptacle for letters and the other for packages.

The running gear of the cart is formed of light material to enable the cart to be drawn by a single horse.

What is claimed, is—

1. In a mail cart, in combination, a body; a seat mounted upon the body and disposed centrally thereof, the sides of the seat being arranged in spaced relation to the side walls of the body; a mail box disposed in the space between each side of the seat and the adjacent side wall of the body, the front wall of each mail box having a pair of hooks secured thereto; and a change receptacle provided with a pair of openings formed in its rear face adapted to receive the hooks of one of said mail boxes, to removably attach said receptacle thereto.

2. In a mail cart, in combination, a body; a seat mounted upon the body and disposed centrally thereof, the sides of the seat being arranged in spaced relation to the side walls of the body; a mail box disposed in the space between each side of the seat and the adjacent side wall of the body, each mail box having a downwardly-inclined cover adapted to be used as a writing desk; a pair of hooks secured to the front wall of each mail box; a change receptacle provided with a pair of openings formed in its rear face and adapted to receive the hooks of one of said mail boxes, to removably attach said receptacle thereto; and a sliding drawer carried by said body and disposed beneath said seat.

In testimony whereof, I affix my signature, in presence of two witnesses.

ELMER D. FALKNER.

Witnesses:
   W. N. FULLER,
   E. HUSER.